UNITED STATES PATENT OFFICE

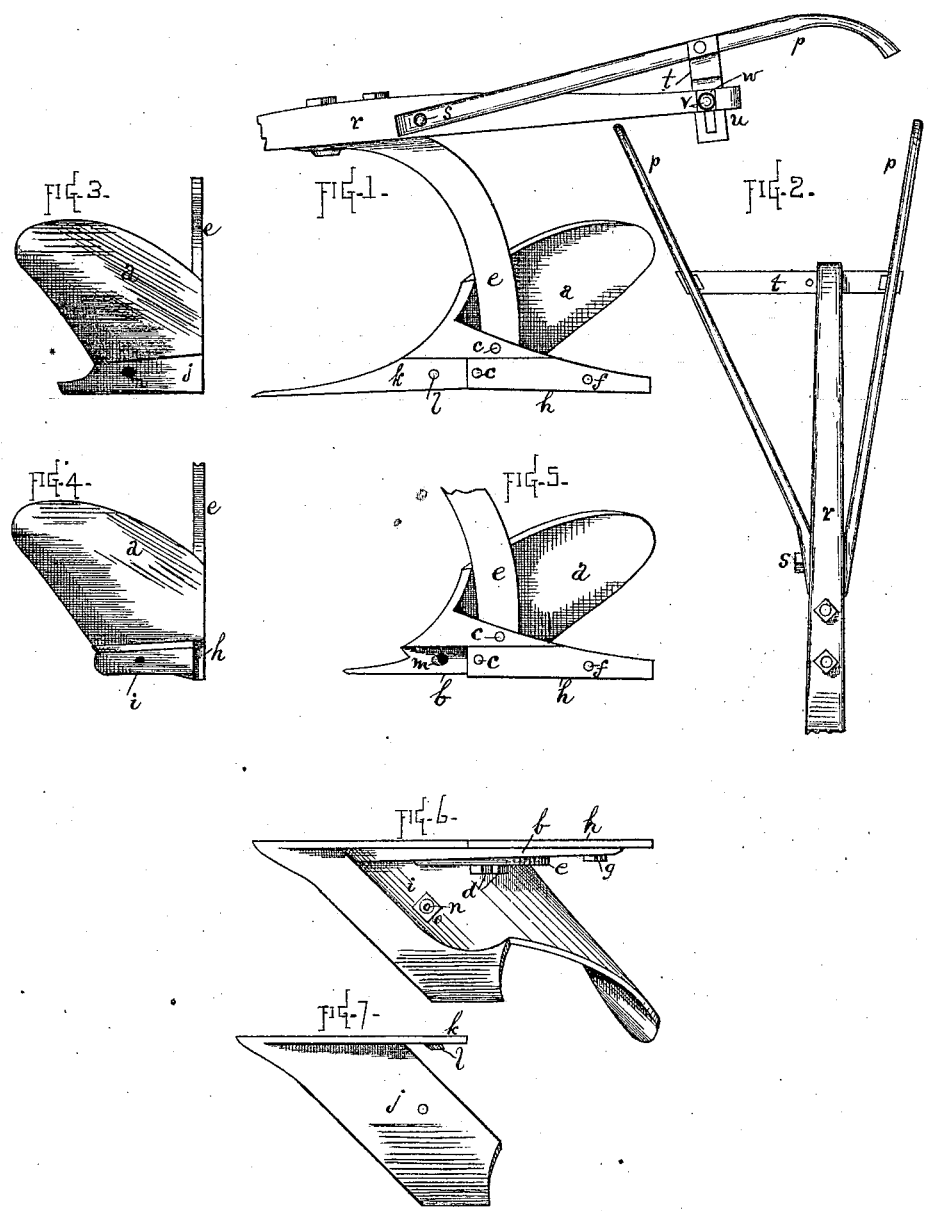

CHRISTIAN MYERS, OF MARYSVILLE, CALIFORNIA.

IMPROVEMENT IN PLOWS.

Specification forming part of Letters Patent No. 185,450, dated December 19, 1876; application filed September 30, 1876.

*To all whom it may concern:*

Be it known that I, CHRISTIAN MYERS, of Marysville, in the county of Yuba and State of California, have invented certain new and useful Improvements pertaining to a Plow, of which the following is a specification, reference being had to the accompanying drawings, where—

Figure 1 is a side view. Fig. 2 is a top view of the beam and handles. Fig. 3 is a front view of the share and mold-board. Fig. 4 is a view same as Fig. 3, except that the share is detached. Fig. 5 is a side view of the mold-board and land-side, with the share detached. Fig. 6 is a bottom view of the mold-board, share, land-side, and standard. Fig. 7 is a bottom view of the share detached from the other parts.

I will first describe the plow, and then specify the features of invention.

The mold-board $a$ and land-side base $b$ are made in one piece, and secured by bolts $c$ and nuts $d$ to the standard $e$. The same nuts and bolts, with the additional bolt $f$ and nut $g$, secure the land-side $h$ to the land-side base $b$. An apron, $i$, is cast upon the lower end of the mold-board $a$, to serve as a rest for the share $j$; or this apron may be made separate from the mold-board and bolted to it; or this apron and the land-side base may be in one piece and the mold-board bolted to it. The share $j$ is made in one piece with the return-flange $k$, which fits upon the land-side base and to the end of the land-side; it bears the stud-pin $l$, fitting to the pin-hole $m$ in the land-side base. A bolt, $n$, and nut $o$ fasten the share to the apron $i$.

In order to attach or detach a share it is only necessary to manipulate the bolt and nut $n$ $o$, which, with the pin $l$, avail to hold the share securely in place. The handles $p$ $p$ are pivoted to beam $r$ by the pin $s$, so that they may be adjusted up or down to fit the height of boys or men. By means of the cross-brace $t$ the handles bear the mortised tongue $u$, acting in co-operation with bolt $v$, running through the mortise and borne by the beam, and nut $w$, by means of which nut and bolt the handles may be fastened at a desired adjustment.

I claim as my invention—

In combination, the mold-board $a$, bearing the apron $i$ and land-side base, having pin-hole $m$, the share $j$, bearing the return-flange $k$, having the stud-pin $l$, and the nut and bolt $n$ $o$.

CHRISTIAN MYERS.

Witnesses:
FRED. G. MOESCH,
G. HORNUNG.